US010310826B2

(12) United States Patent
Rong et al.

(10) Patent No.: US 10,310,826 B2
(45) Date of Patent: Jun. 4, 2019

(54) TECHNOLOGIES FOR AUTOMATIC REORDERING OF SPARSE MATRICES

(71) Applicant: Intel Corporation, Santa Clara, CA (US)

(72) Inventors: Hongbo Rong, San Jose, CA (US); Jongsoo Park, Santa Clara, CA (US); Todd A. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/946,200

(22) Filed: Nov. 19, 2015

(65) Prior Publication Data

US 2017/0147301 A1 May 25, 2017

(51) Int. Cl.
*G06F 8/41* (2018.01)
*G06F 17/16* (2006.01)

(52) U.S. Cl.
CPC ............ *G06F 8/433* (2013.01); *G06F 8/4434* (2013.01); *G06F 8/4442* (2013.01); *G06F 17/16* (2013.01)

(58) Field of Classification Search
CPC ............................... G06F 8/4434; G06F 8/433
See application file for complete search history.

(56) References Cited

U.S. PATENT DOCUMENTS

| | | | | |
|---|---|---|---|---|
| 5,790,865 | A * | 8/1998 | Smaalders ............ | G06F 8/4441 714/E11.2 |
| 5,842,022 | A | 11/1998 | Nakahira et al. | |
| 6,226,790 | B1 | 5/2001 | Wolf et al. | |
| 2008/0127059 | A1 * | 5/2008 | Eichenberger .......... | G06F 8/447 717/106 |

(Continued)

FOREIGN PATENT DOCUMENTS

| | | | |
|---|---|---|---|
| JP | 2008-181386 | A | 8/2008 |

OTHER PUBLICATIONS

Liu et al., "Efficient Sparse Matrix-Vector Multiplication on x86-Based Many-Core Processors", ICS '13, Jun. 10-14, 2013, ACM 978-1-4503-2130—Mar. 13, 2006.

(Continued)

*Primary Examiner* — Li B. Zhen
*Assistant Examiner* — Amir Soltanzadeh
(74) *Attorney, Agent, or Firm* — Barnes & Thornburg LLP

(57) ABSTRACT

Technologies for automatic reordering of sparse matrices include a computing device to determine a distributivity of an expression defined in a code region of a program code. The expression is determined to be distributive if semantics of the expression are unaffected by a reordering of an input/output of the expression. The computing device performs inter-dependent array analysis on the expression to determine one or more clusters of inter-dependent arrays of the expression, wherein each array of a cluster of the one or more clusters is inter-dependent on each other array of the cluster, and performs bi-directional data flow analysis on the code region by iterative backward and forward propagation of reorderable arrays through expressions in the code region based on the one or more clusters of the inter-dependent arrays. The backward propagation is based on a backward transfer function and the forward propagation is based on a forward transfer function.

24 Claims, 16 Drawing Sheets

(56) References Cited

U.S. PATENT DOCUMENTS

| | | | | |
|---|---|---|---|---|
| 2009/0064121 | A1 | 3/2009 | Archambault et al. | |
| 2010/0074342 | A1* | 3/2010 | Shental | G06F 17/12 375/259 |
| 2011/0161944 | A1 | 6/2011 | Cho et al. | |
| 2011/0246537 | A1* | 10/2011 | Labbi | G06F 17/30994 707/805 |
| 2012/0167069 | A1* | 6/2012 | Lin | G06F 8/4441 717/160 |
| 2012/0254847 | A1* | 10/2012 | George | G06F 8/441 717/156 |

OTHER PUBLICATIONS

"Sparse Matrices", downloaded from http://www.mathworks.com/help/matlab/examples/sparse-matrices.html? procode-ML#zmw57dd0e2186.

Heber et al., "Self-avoiding walks over adaptive unstructured grids", Concurrency:Pract. Exper., 12(200), pp. 35-109.

Oliker et al., "Effects of Ordering Strategies and Programming Paradigms on Sparse Matrix Computations", Siam Review, vol. 44, No. 3, pp. 373-393.

Cuthill and McKee, "Reducing the Bandwidth of Sparse Symmetric Matrices," Proceeding ACM '69 Proceedings of the 1969 24th national conference, pp. 157-172 (1969).

Japanese Office Action and English Summary for Patent Application No. 2016-219481, dated Oct. 17, 2017, 5 pages.

Kawabata, Hideyuki et al., "CMC: A Compiler for Sparse matrix Computations," vol. 45, No. SIG11 (ACS7), Oct. 2004, pp. 378-392.

IPSJ SIC Technical Report, vol. 2014-HPC-144 No. 5, May 19, 2014, 11 pages.

PSJ SIC Technical Report, vol. 2015-HPC-151 No. 8, Oct. 8, 2015, 9 pages.

International search report for PCT application No. PCT/US2016/054500, dated Jan. 2, 2017 (3 pages).

Written opinion for PCT application No. PCT/US2016/054500, dated Jan. 2, 2017 (5 pages).

* cited by examiner

400

402

```
for κ = 1 : 1000
  old_rz = rz
  α = old_rz / dot(p, A * p)
  x = x + α * p
  r = r - α * A * p
  if r is sufficiently small
      break
  end
  z = i .* r
  rz = dot(r, z)
  β = rz / old_rz
  p = z + β * p
end
print(x)
```

```
A = reorder(A)
for κ = 1 : 1000
  p = reorder(p)
  x = reorder(x)
  r = reorder(r)
  old_rz = rz
  α = old_rz / dot(p, A * p)
  x = x + α * p
  r = r - α * A * p
  if r is sufficiently small
    x = reverse_reorder(x)
    break
  end
  i = reorder(i)
  z = i .* r
  rz = dot(r, z)
  β = rz / old_rz
  p = z + β * p
  p = reverse_reorder(p)
  x = reverse_reorder(x)
  r = reverse_reorder(r)
  i = reverse_reorder(i)
end
print(x)
```

```
A = reorder(A)
p = reorder(p)
x = reorder(x)
r = reorder(r)
i = reorder(i)
for κ = 1 : 1000
  old_rz = rz
  α = old_rz / dot(p, A * p)
  x = x + α * p
  r = r - α * A * p
  if r is sufficiently small
    break
  end
  z = i .* r
  rz = dot(r, z)
  β = rz / old_rz
  p = z + β * p
end
x = reverse_reorder(x)
print(x)
```

| Block | State | Initial state | Precondit-ioning | Growth: Backward pass | Growth: Forward pass | Growth: Backward pass | Growth: Forward pass |
| --- | --- | --- | --- | --- | --- | --- | --- |
| B1: F=E | In | | | {E, G} | {E, G} | No change | No change |
| | Out | {F} | {F} | {F, G} | {F, E, G} | | |
| B2: H=F+G | In | | {F} | {F, G} | {F, E, G} | | |
| | Out | ∅ | {F, G, H} | {F, G, H} | {F, G, E, H} | | |

| Node | State | Initialization | Preconditioning | 1st backward pass |
|---|---|---|---|---|
| B1 | IN | | | {A} |
| | OUT | {A} | {A} | {A} |
| B2 | IN | | {A} | {A} |
| | OUT | 𝕌 | {A} | {A} |
| B3 | IN | | {A} | {A, p, x, r} |
| | OUT | 𝕌 | {A} | {A, p, x, r} |
| B4 | IN | | {A} | {A, p, x, r} |
| | OUT | 𝕌 | {A, p} | {A, p, x, r} |
| B5 | IN | | {A, p} | {A, p, x, r} |
| | OUT | 𝕌 | {A, p, x} | {A, p, x, r} |
| B6 | IN | | {A, p, x} | {A, p, x, r} |
| | OUT | 𝕌 | {A, p, x, r} | {A, p, x, r} |
| B7 | IN | | {A, p, x, r} | {A, p, x, r} |
| | OUT | 𝕌 | {A, p, x, r} | {A, p, x, r} |
| B8 | IN | | {A, p, x, r} | {A, p, x, r, i} |
| | OUT | 𝕌 | {A, p, x, r, i, z} | {A, p, x, r, i, z} |
| B9 | IN | | {A, p, x, r, i, z} | {A, p, x, r, i, z} |
| | OUT | 𝕌 | {A, p, x, r, i, z} | {A, p, x, r, i, z} |
| B10 | IN | | {A, p, x, r, i, z} | {A, p, x, r, i, z} |
| | OUT | 𝕌 | {A, p, x, r, i, z} | {A, p, x, r, i, z} |
| B11 | IN | | {A, p, x, r, i, z} | {A, p, x, r, i, z} |
| | OUT | 𝕌 | {A, p, x, r, i, z} | {A, p, x, r, i, z} |
| B12 | IN | | {A, p, x, r, i, z} | {A, p, x, r, i, z} |
| | OUT | 𝕌 | {A, p, x, r, i, z} | {A, p, x, r, i, z} |
| B13 | IN | ∅ | ∅ | ∅ |
| | OUT | ∅ | ∅ | ∅ |

| Node | State | Initialization | Preconditioning | 1st backward pass |
|---|---|---|---|---|
| B1 | IN<br>OUT | <br>{A} | <br>{A} | {A, p, r, i}<br>{A, p, r, i} |
| B2 | IN<br>OUT | <br>𝕌 | {A}<br>{A} | {A, p, r, i}<br>{A, p, r, i} |
| B3 | IN<br>OUT | <br>𝕌 | {A}<br>{A} | {A, p, x, r, i}<br>{A, p, x, r, i} |
| B4 | IN<br>OUT | <br>𝕌 | {A}<br>{A, p} | {A, p, x, r, i}<br>{A, p, x, r, i} |
| B5 | IN<br>OUT | <br>𝕌 | {A, p}<br>{A, p, x} | {A, p, x, r, i}<br>{A, p, x, r, i} |
| B6 | IN<br>OUT | <br>𝕌 | {A, p, x}<br>{A, p, x, r} | {A, p, x, r, i}<br>{A, p, x, r, i} |
| B7 | IN<br>OUT | <br>𝕌 | {A, p, x, r}<br>{A, p, x, r} | {A, p, x, r, i}<br>{A, p, x, r, i} |
| B8 | IN<br>OUT | <br>𝕌 | {A, p, x, r}<br>{A, p, x, r, i, z} | {A, p, x, r, i}<br>{A, p, x, r, i, z} |
| B9 | IN<br>OUT | <br>𝕌 | {A, p, x, r, i, z}<br>{A, p, x, r, i, z} | {A, p, x, r, i, z}<br>{A, p, x, r, i, z} |
| B10 | IN<br>OUT | <br>𝕌 | {A, p, x, r, i, z}<br>{A, p, x, r, i, z} | {A, p, x, r, i, z}<br>{A, p, x, r, i, z} |
| B11 | IN<br>OUT | <br>𝕌 | {A, p, x, r, i, z}<br>{A, p, x, r, i, z} | {A, p, x, r, i, z}<br>{A, p, x, r, i, z} |
| B12 | IN<br>OUT | <br>𝕌 | {A, p, x, r, i, z}<br>{A, p, x, r, i, z} | {A, p, x, r, i, z}<br>{A, p, x, r, i, z} |
| B13 | IN<br>OUT | ∅<br>∅ | ∅<br>∅ | ∅<br>∅ |

| Node | State | Initialization | Preconditioning | 1st backward pass |
|---|---|---|---|---|
| B1 | IN | | | {A, p, x, r, i} |
| | OUT | {A} | {A} | {A, p, x, r, i} |
| B2 | IN | | {A} | {A, p, x, r, i} |
| | OUT | U | {A} | {A, p, x, r, i} |
| B3 | IN | | {A} | {A, p, x, r, i} |
| | OUT | U | {A} | {A, p, x, r, i} |
| B4 | IN | | {A} | {A, p, x, r, i} |
| | OUT | U | {A, p} | {A, p, x, r, i} |
| B5 | IN | | {A, p} | {A, p, x, r, i} |
| | OUT | U | {A, p, x} | {A, p, x, r, i} |
| B6 | IN | | {A, p, x} | {A, p, x, r, i} |
| | OUT | U | {A, p, x, r} | {A, p, x, r, i} |
| B7 | IN | | {A, p, x, r} | {A, p, x, r, i} |
| | OUT | U | {A, p, x, r} | {A, p, x, r, i} |
| B8 | IN | | {A, p, x, r} | {A, p, x, r, i} |
| | OUT | U | {A, p, x, r, i, z} | {A, p, x, r, i, z} |
| B9 | IN | | {A, p, x, r, i, z} | {A, p, x, r, i, z} |
| | OUT | U | {A, p, x, r, i, z} | {A, p, x, r, i, z} |
| B10 | IN | | {A, p, x, r, i, z} | {A, p, x, r, i, z} |
| | OUT | U | {A, p, x, r, i, z} | {A, p, x, r, i, z} |
| B11 | IN | | {A, p, x, r, i, z} | {A, p, x, r, i, z} |
| | OUT | U | {A, p, x, r, i, z} | {A, p, x, r, i, z} |
| B12 | IN | | {A, p, x, r, i, z} | {A, p, x, r, i, z} |
| | OUT | U | {A, p, x, r, i, z} | {A, p, x, r, i, z} |
| B13 | IN | ∅ | ∅ | ∅ |
| | OUT | ∅ | ∅ | ∅ |

FIG. 15

TECHNOLOGIES FOR AUTOMATIC REORDERING OF SPARSE MATRICES

BACKGROUND

High performance computing (HPC) on sparse data structures such as graphs and sparse matrices is becoming increasingly important in a wide array of fields including, for example, machine learning, computational science, physical model simulation, web searching, and knowledge discovery. Traditional high performance computing applications generally involve regular and dense data structures; however, sparse computation has some unique challenges. For example, sparse computation typically has considerably lower compute intensity than dense computation and, therefore, its performance is often limited by memory bandwidth. Additionally, memory access patterns and the amount of parallelism vary widely depending, for example, on the specific sparsity pattern of the input data, which complicates optimization as certain optimization information is often unknown a priori.

Systems may modify the input data set to obtain high data locality in order to address those challenges. For example, a system may employ reordering, which permutes rows and/or columns of a matrix in order to cluster non-zero entries near one another. For example, the system may reorder a sparse matrix 100 to generate a banded matrix 102 in which the non-zero entries 104 are clustered near one another as shown in FIGS. 1A-B. By doing so, the system increases the chances that a particular memory read involves more non-zero entries (i.e., spatial locality) and may result in more reuse out of cache (i.e., temporal locality) than without reordering. Various reordering algorithms have been developed and implemented including, for example, Breadth First Search (BFS), Reverse Cuthill-McKee (RCM), Self-Avoiding Walk (SAW), METIS Partitioner, and King's algorithms. In particular, BFS and its more refined version, RCM, are frequently used to optimize for cache locality in sparse matrix vector multiplication (SpMV) due to its lesser complexity and greater efficiency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4A is at least one embodiment of a section of program code;

FIGS. 4B-4C are embodiments of reordered versions of the section of program code of FIG. 4A;

FIG. 9 is a partial table of at least one embodiment of results from the application of bi-directional analysis for the discovery of reorderable arrays;

FIG. 11 is a partial table of at least one embodiment of results from the application of bi-directional analysis to the program code of FIG. 10 without optimization;

FIG. 13 is a partial table of at least one embodiment of results from the application of bi-directional analysis to the program code of FIG. 10 with optimization based on liveness;

FIG. 15 is a partial table of at least one embodiment of results from the application of bi-directional analysis to the program code of FIG. 10 with optimization based on execution frequency.

DETAILED DESCRIPTION OF THE DRAWINGS

Figure 1B:
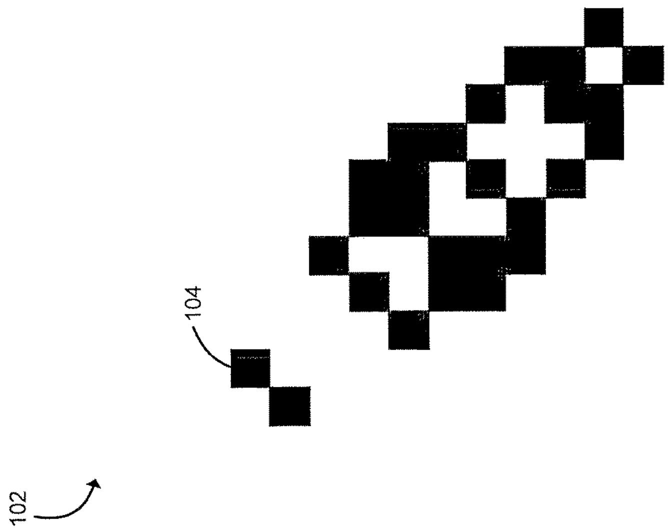
FIG. 1B is a simplified diagram of at least one embodiment of a reordered sparse matrix.
Figure 1A:
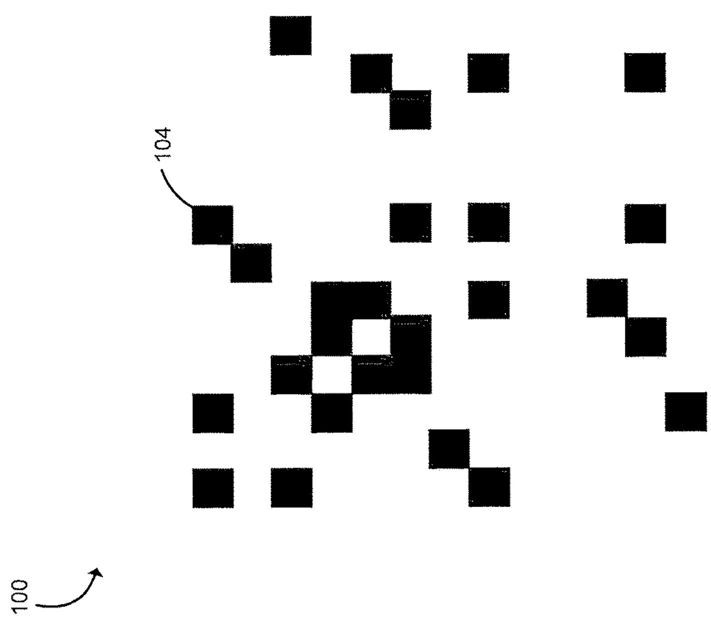
FIG. 1A is a simplified diagram of at least one embodiment of a sparse matrix.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
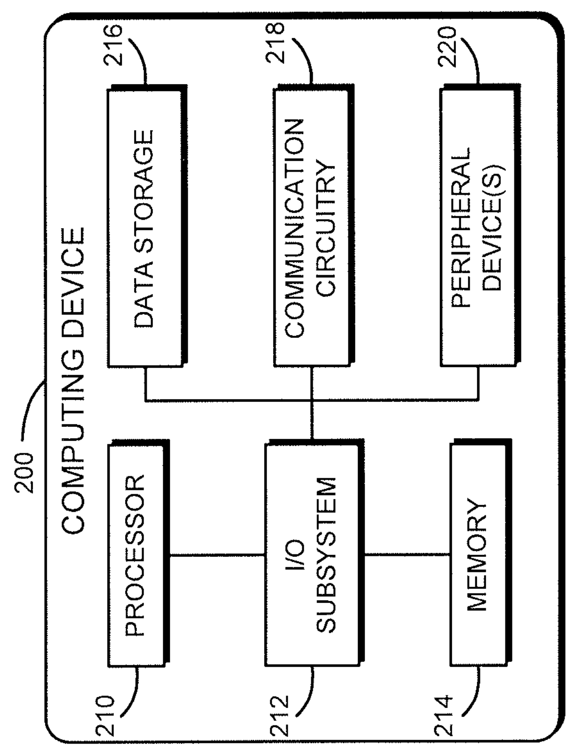
FIG. 2 is a simplified block diagram of at least one embodiment of a computing device for automatic reordering of sparse matrices.

Referring now to FIG. 2, a computing device 200 for automatic reordering of sparse matrices is shown. As described in detail below, the computing device 200 is configured to automatically apply the algorithm(s) described herein to an arbitrary reordering function (e.g., for speeding up execution of sparse kernels) to automatically determine if reordering is applicable/permissible to the arbitrary function, and if so, to apply the algorithm(s) without changing the semantics of the underlying expression(s). It should be appreciated that such an automatic reordering technique may improve even an expert programmer's abilities and/or efficiency, for example, by eliminating or reducing the need for manual reordering optimization, which is often an error-prone and time-consuming process. In the illustrative embodiment, the computing device 200 determines the feasibility of reordering by confirming that the statements in a particular code region of interest are distributive, and if so, identifies array(s) (e.g., multi-dimensional matrices and/or one-dimensional vectors) to reorder and/or reverse-reorder before, after, and/or within the code region such that the code outside the code region is not affected by the reordering.

The computing device 200 may be embodied as any type of computing device or system capable of performing the functions described herein. For example, in some embodiments, the computing device 200 may be embodied as a desktop computer, laptop computer, tablet computer, notebook, netbook, Ultrabook™, smartphone, cellular phone, wearable computing device, personal digital assistant, mobile Internet device, smart device, server, router, switch, Hybrid device, and/or any other computing/communication device. As shown in FIG. 2, the illustrative computing device 200 includes a processor 210, an input/output ("I/O") subsystem 212, a memory 214, a data storage 216, a communication circuitry 218, and one or more peripheral devices 220. Of course, the computing device 200 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the computing device 200 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the computing device 200. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the computing device 200, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the computing device 200 as described herein.

The communication circuitry 218 may be embodied as any communication circuit, device, or collection thereof, capable of enabling communications between the computing device 200 and other remote devices over a network. For example, in some embodiments, the computing device 200 may receive a user program, an identity of a first array to reorder (FAR), and/or other useful data for performing the functions described herein from a remote computing device. The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 220 may include any number of additional peripheral or interface devices, such as speakers, microphones, additional storage devices, and so forth. The particular devices included in the peripheral devices 220 may depend on, for example, the type and/or intended use of the computing device 200.

Figure 3:
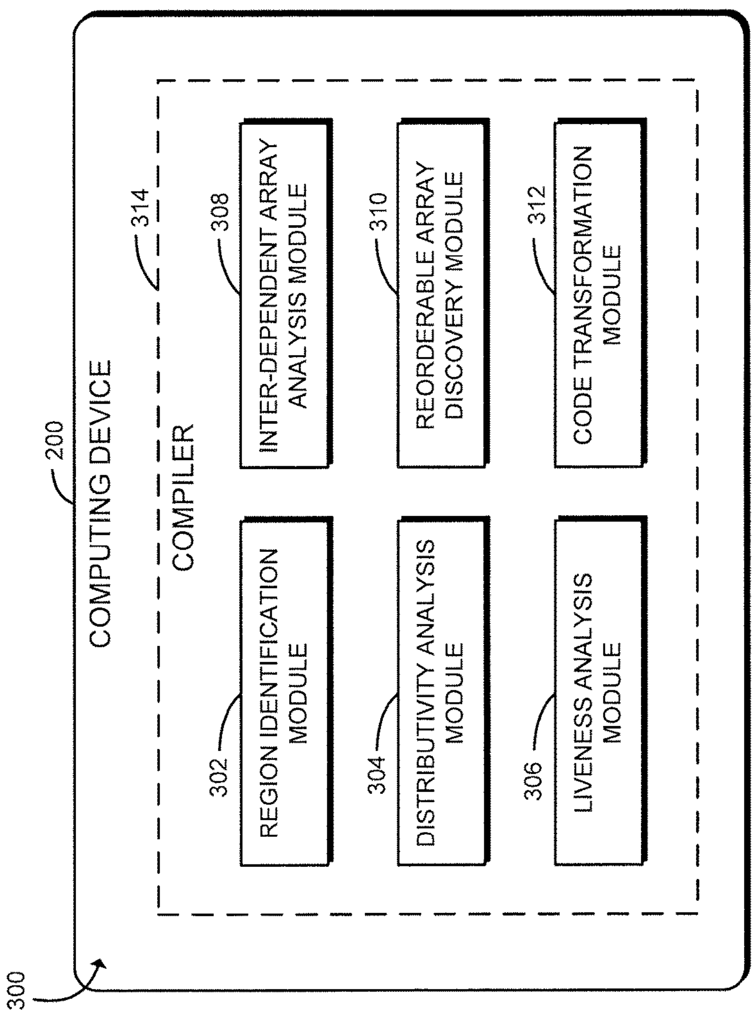
FIG. 3 is a simplified block diagram of at least one embodiment of an environment of the computing device of FIG. 2.

Referring now to FIG. 3, in use, the computing device 200 establishes an environment 300 for automatic reordering of sparse matrices. The illustrative environment 300 includes a region identification module 302, a distributivity analysis module 304, a liveness analysis module 306, an inter-dependent array analysis module 308, a reorderable array discovery module 310, and a code transformation module 312. The various modules of the environment 300 may be embodied as hardware, software, firmware, or a combination thereof. For example, the various modules, logic, and other components of the environment 300 may form a portion of, or otherwise be established by, the processor 210 or other hardware components of the computing device 200. As such, in some embodiments, one or more of the modules of the environment 300 may be embodied as circuitry or collection of electrical devices (e.g., a region identification circuitry 302, a distributivity analysis circuitry 304, a liveness analysis circuitry 306, an inter-dependent array analysis circuitry 308, a reorderable array discovery circuitry 310, and/or a code transformation circuitry 312). It should be appreciated that, in such embodiments, one or more of the region identification circuitry 302, the distributivity analysis circuitry 304, the liveness analysis circuitry 306, the inter-dependent array analysis circuitry 308, the reorderable array discovery circuitry 310, and/or the code transformation circuitry 312 may form a portion of one or more of the processor 210, the I/O subsystem 212, the memory 214, the data storage 216, the communication circuitry 218, and/or the peripheral devices 220. Additionally, in some embodiments, one or more of the illustrative modules may form a portion of another module and/or one or more of the illustrative modules may be independent of one another. As shown in FIG. 3, in some embodiments, one or more of the various modules of the environment 300 may be form a portion of, or be executed by, a compiler 314 of the computing device 200.

As described herein, the computing device 200 is configured to apply a reordering transformation to a code region of a program, for example, in order to improve the execution time of the program. The region identification module 302 is configured to identify the code region to analyze for reordering. It should be appreciated that the code region may be an arbitrary expression, block, statement, set/sequence of statements/instructions, and/or another part of the program. For example, in some embodiments, the code region may include sequential statements, loop statements (e.g., "for," "repeat . . . until," "while," etc.), flow control statements (e.g., "if . . . else," "goto," "break," "exit," etc.), and/or other statements. More specifically, in some embodiments, the region identification module 302 selects a linear loop region that includes no flow statements as the code region. Further, in some embodiments, the region identification module 302 may select a code region where the program spends a significant amount of its execution time (e.g., for at least a threshold period of time, at least a threshold number of clock cycles, and/or otherwise determined). For ease of discussion, the terms "expression," "block," and/or "statement" may be used interchangeable throughout the description depending on the particular context.

It should be appreciated that the reordering transformation may affect the code region by reordering some arrays prior to use within the code region. Additionally, an array that may be used subsequent to the code region may be reverse-reordered (i.e., the inverse operation of the reordering may be applied to return the reordered array to its initial state) to ensure program code outside the code region is unaffected. Further, if the code region includes flow control statements, one or more arrays may be ordered along various paths in the code region and/or reverse-reordered as appropriate to account for such statements. In some embodiments in which the code region is a linear loop region, the reordering may only occur outside the code region.

An exemplary embodiment of a section of a program code 400 is shown in FIG. 4A. As shown, the general code region 400 includes a code region 402 identified by the region identification module 302 and a "print(x)" statement outside the identified code region 402. It should be appreciated that the code region 402 includes an outer loop statement and various operational statements within the outer loop statement. As described herein, one or more of the variables/arrays used in the code region may be reordered, which affects the statements/instructions present in the program code 400. For example, in some embodiments, the reordering may involve the insertion of "reorder( )" statements and/or "reverse_reorder( )" statements within the code region 402 as shown in FIG. 4B (e.g., in addition to the insertion of such statements outside the code region 402) to generate a modified version of the program code 400. In other embodiments, the reordering may only involve the insertion of such reordering statements outside the code region 402 (e.g., a linear loop region) as shown in FIG. 4C (e.g., immediately prior and subsequent to the code region 402) to generate a modified version of the program code 400.

The distributivity analysis module 304 is configured to determine the distributivity of one or more (e.g., each) of the expressions defined in the identified code region. That is, the distributivity analysis module 304 may scan all of the expressions in the code region and determine if a reordering is distributive over each of the expressions. In the illustrative embodiment, a reordering, R, may be defined according to $R(x)=P'*x*P$ if x is a matrix (i.e., a similarity transformation), $R(x)=P'*x$ if x is a vector, or $R(x)=x$ if x is a scalar number, where P is a permutation matrix and P' is the transpose/inverse of P. Further, in the illustrative embodiment, a reordering, R, over an expression, ε, is distributive if its semantics remains the same regardless of whether its output is reordered and/or its inputs are reordered. In other words, $R(\varepsilon(i_{1, \ldots, n}))=\varepsilon(R(i_1), \ldots, R(i_n))$ where $i_{1, \ldots, n}$ is a set of inputs.

In some embodiments, a code region with no flow control statements may be interpreted collectively as a single expression. If a reordering is distributive over all expression in a particular code region, it should be appreciated that the reordering is also distributive over the entire region as a collective expression in the illustrative embodiment. As such, in order to reorder the result of the code region, the computing device 200 may reorder the inputs to the code region without modifying code inside the region. In embodiments in which the code region does include flow control statements, one or more of the inputs may be conditional and, therefore, reordering of those inputs may also be conditional (see, for example, FIG. 4B).

It should be appreciated that some commonly seen array-related expressions are often distributive. For example, the expressions $M*N$, $M+N$, $M-N$, $M*v$, $M^{-1}v$, $v \cdot w$, $v+w$, $v-w$, $n*M$, and $n*v$ are generally distributive, where M and N are matrices, v and w are vectors, and n is a scalar number. Additionally, a reordering is generally distributive over expressions without inputs and outputs (e.g., conditional "if(n)" and "goto" statements) and over expressions with scalar inputs and outputs. In contrast, some other commonly seen array-related expressions are not distributive. For example, expressions requiring inputs and/or outputs to be a particular "shape" (e.g., a triangular solver that assumes an input to be an upper or lower triangular matrix), input/output expressions (e.g., print commands), expressions requiring bitwise reproducibility, and/or functions unknown to the compiler 314 may be deemed generally non-distributive. It should be appreciated that, if the source code for a particular user-defined function is available, the source code may be analyzed consistent with the techniques described herein to determine its distributivity. Although code region formation/identification and distributivity analysis are described herein separately, in some embodiments, code region formation and distributivity may be analyzed concurrently. For example, in some embodiments, the computing device 200 may begin with an empty region and gradually "grow" the region by adding statements confirmed to be distributive.

The liveness analysis module 306 is configured to determine a liveness (i.e., whether a variable/array is alive or dead) of one or more (e.g., each) variables/arrays at one or more locations within the code region. For example, in some embodiments, the liveness analysis module 306 may determine the liveness of each variable before and/or after each statement/expression in the code region. In the illustrative embodiment, a variable/array is considered to be live at a particular programming point in the program code if it is possible that the variable will be used in the future (i.e., subsequent to that programming point). It should be appreciated that the computing device 200 (e.g., the compiler 314) may utilize any suitable techniques, algorithms, and/or mechanisms for determining the liveness of a variable.

The inter-dependent array analysis module 308 is configured to analyze a particular expression to construct or otherwise determine clusters of inter-dependent arrays/variables of the expression. In the illustrative embodiment, a set of arrays are considered to be inter-dependent of one another if a reordering of any of those arrays would necessitate a reordering of the other arrays. For example, if a sparse matrix A in the expression x=A*y is reordered (e.g., some columns and/or rows are exchanged), then the vectors x and y must be reordered. Similarly, if either x or y is reordered, then A must be reordered accordingly. It should be appreciated that, in general, an assignment statement of an expression involving one or more arrays to another array is indicative of inter-dependency between each of those arrays. For example, if the code region includes a statement, $array_1=\varepsilon(array_2, array_3)$, where ε is an expression of the arrays $array_2$ and $array_3$, then the arrays $array_1$, $array_2$, and $array_3$ are inter-dependent arrays. As described in greater detail below, in some embodiments, the inter-dependent array analysis module 308 may generate an expression tree for a particular statement in order to determine which variables/arrays of the expression are inter-dependent of one another and thereby generate the clusters. Of course, in some embodiments, a statement may be expressed in a 3-address format (result, operator, and two operands), which is implicitly an expression tree, without explicit generation of an expression tree.

The reorderable array discovery module 310 is configured to perform bi-directional data flow analysis on the identified code region in order to discover reorderable arrays in the code region. As described below, in some embodiments, the reorderable array discovery module 310 may iteratively perform backward propagation of reorderable arrays through the expression(s) in the code region based on a backward transfer function and forward propagation based on a forward transfer function. For example, in some embodiments, the reorderable array discovery module 310 may identify a sparse array with data locality that may be improved by a reordering transformation and analyze/propagate that array with bi-directional flow analysis (e.g., to determine other arrays to reorder). In some embodiments, such array may be the first one or few sparse arrays related to some operation(s) known to be important to the code region (e.g., sparse matrix vector multiplication (SpMV)). In another embodiment, the reorderable array discovery module 310 may receive a first array to reorder (FAR) from the user (e.g., via user annotations of the code region for analysis by the compiler 314).

The code transformation module 312 is configured to reorder and/or reverse-reorder one or more arrays in the code region and/or within the vicinity of the code region in the program code (e.g., immediately prior to or subsequent to the code region). In the illustrative embodiment, it should be appreciated that the code transformation module 312 determines the particular arrays to reorder and/or reverse-order and the particular locations in the program code at which to perform such operations based on the bi-directional flow analysis of the reorderable array discovery module 310. Further, it should be appreciated that the code transformation module 312 may employ any suitable reordering algorithm depending on the particular embodiment and may utilize any suitable algorithm, technique, and/or mechanism to actually effect the transformation of the program code.

Figure 5:
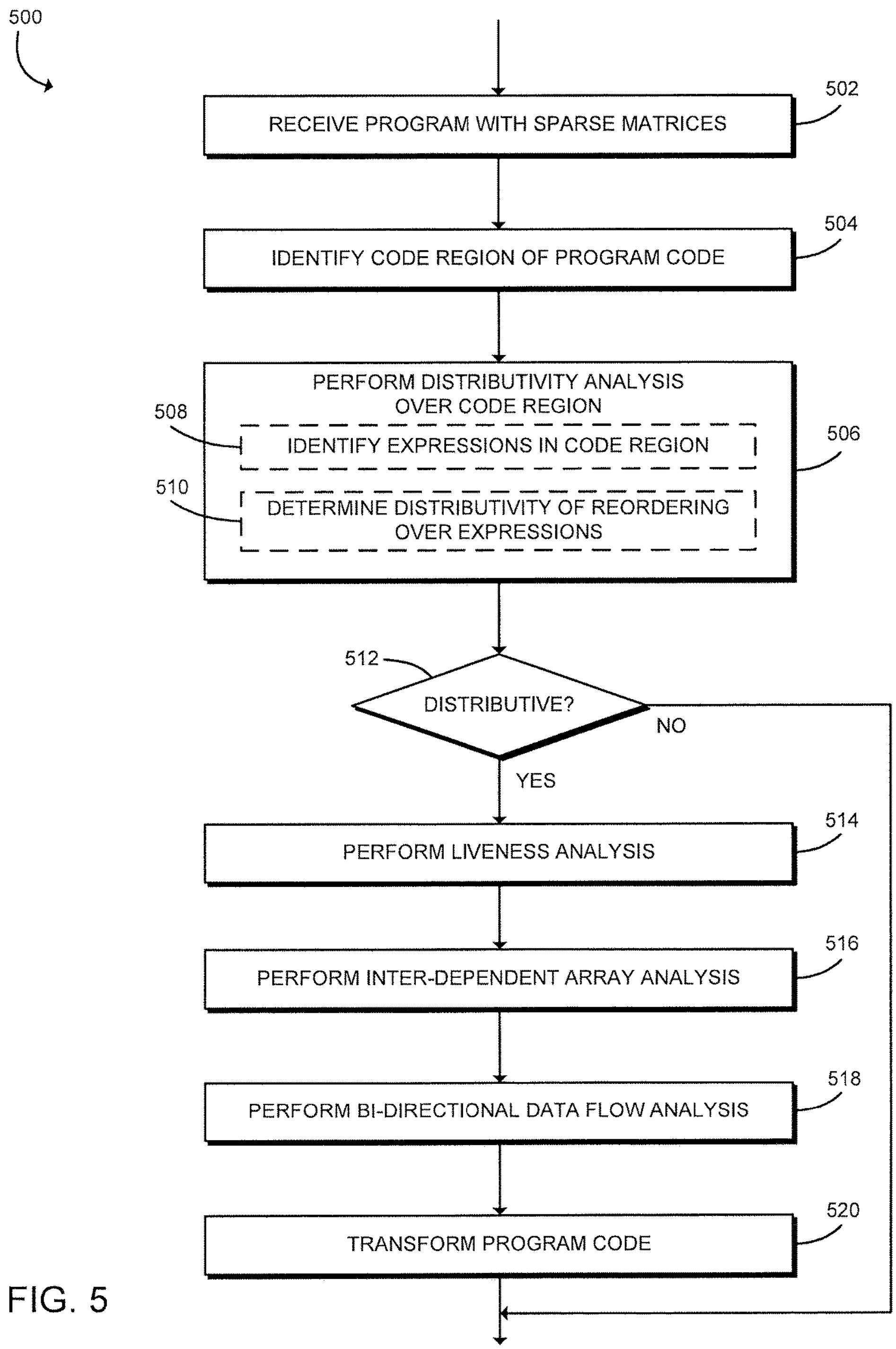
FIG. 5 is a simplified flow diagram of at least one embodiment of a method for automatic reordering of sparse matrices that may be executed by the computing device of FIG. 2.

Referring now to FIG. 5, in use, the computing device 200 may execute a method 500 for automatic reordering of sparse matrices (e.g., without user direction and/or intervention). The illustrative method 500 begins with block 502 in which the computing device 200 receives a program (e.g., the program code) that includes one or more sparse matrices that may be reordered. More specifically, in some embodiments, the program code may be retrieved by the compiler 314 of the computing device 200. In block 504, the computing device 200 identifies a code region of the program code to analyze for reordering of arrays. As described above, the code region may be any arbitrary portion of program code; however, in some embodiments, the identified/selected code region is a linear loop region or another portion of the program code at which there is a significant amount of execution time.

In block 506, the computing device 200 performs distributivity analysis of the code region of the program code in order to determine the distributivity of one or more (e.g., each) of the expressions defined in the identified code region. Accordingly, in block 508, the computing device 200 may identify the particular expressions in the code region and, in block 510, determine the distributivity of a reordering algorithm over the expressions. For example, the computing device 200 may scan all of the expressions in the code region and determine whether a reordering is distributive over each of the expressions. As described above, in the illustrative embodiment, a reordering, R, over an expression, ε, is distributive if its semantics remains the same regardless of whether its output is reordered and/or its inputs are reordered. That is, the reordering R is distributive over an expression ε if $R(\varepsilon(i_{1, \ldots, n}))=\varepsilon(R(i_1), \ldots, R(i_n))$ where $i_{1, \ldots, n}$ is a set of inputs. In some embodiments, the expressions may include commonly used array-related expressions known to be either distributive or non-distributive. Accordingly, in some embodiments, the computing device 200 may determine the types of operations performed on the particular arrays in a given expression. Although the distributivity analysis is described as being subsequent to the code region identification, in some embodiments, distributivity analysis and code region identification may occur concurrently. For example, in some embodiments, the computing device 200 may begin with an empty region and gradually "grow" the code region by adding statements identified/known to be distributive.

If the computing device 200 determines, in block 512, that one or more of the expressions in the code region are non-distributive, the method 500 terminates. However, if the computing device 200 determines that the reordering is distributive over each of the expressions in the code region and, therefore, distributive over the code region as a whole, the computing device 200 performs liveness analysis on the code region, in block 514, to determine a liveness of one or more (e.g., each) of the arrays at various programming points within the code region. For example, in some embodiments, the computing device 200 determines whether an array is "live" or "dead" before and after each statement/expression in the code region. As indicated above, the computing device 200 (e.g., the compiler 314) may employ any suitable techniques, algorithms, and/or mechanisms for determining the liveness of a variable. Further, although liveness analysis is shown in FIG. 5 as being subsequent to the distributivity analysis, in some embodiments, liveness analysis may be performed prior to the distributivity analysis.

Figure 6:
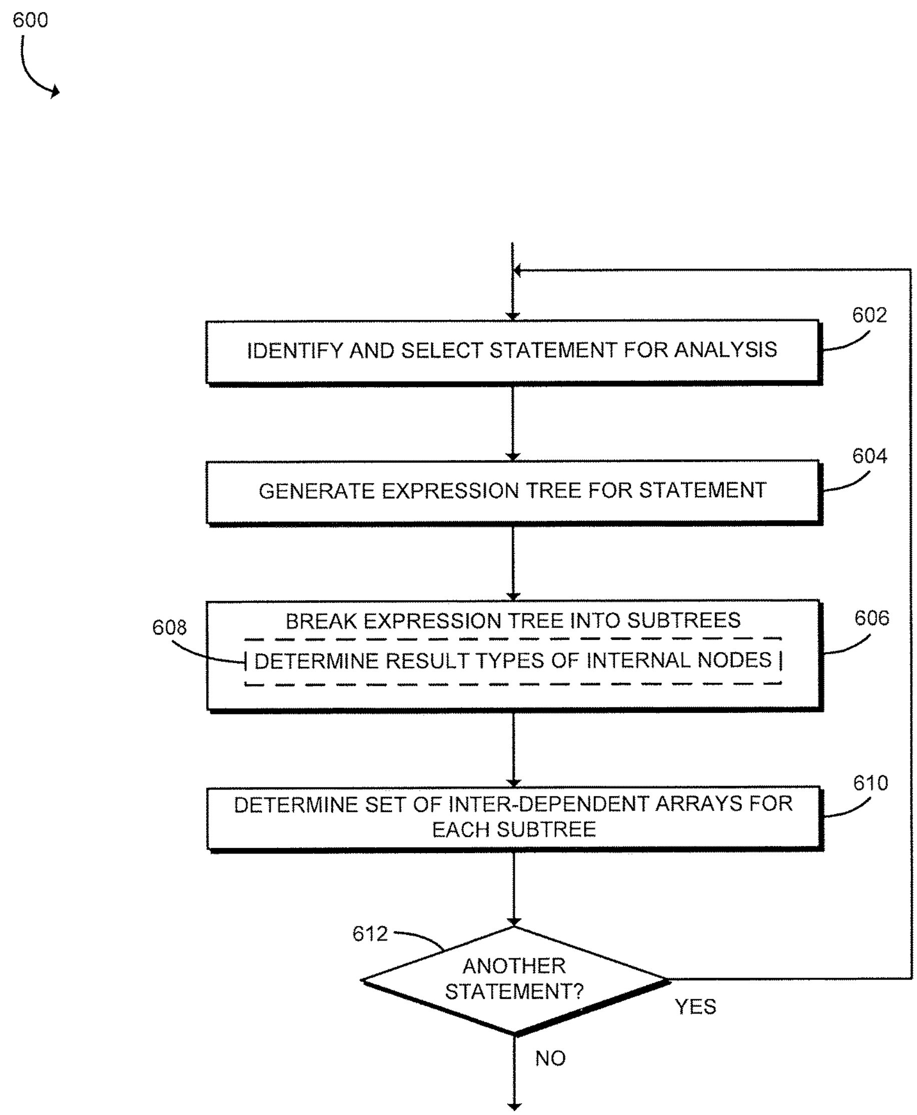
FIG. 6 is a simplified flow diagram of at least one embodiment of a method for performing inter-dependent array analysis that may be executed by the computing device of FIG. 2.

In block 516, the computing device 200 performs inter-dependent array analysis on one or more (e.g., each) expressions in the code region to determine, for each of those expressions, which arrays/variables of the expression are inter-dependent of one another and generates appropriate clusters based on that determination. In other words, the computing device 200 determines whether a reordering of an array of an expression would necessitate the reordering of other arrays of the expression. For example, as indicated above, if the code region includes a statement, $array_1=\varepsilon(array_2, array_3)$, where ε is an expression of the arrays $array_2$ and $array_3$, then the arrays $array_1$, $array_2$, and $array_3$ are inter-dependent arrays. In some embodiments, the computing device 200 may execute a method 600 to generate and analyze an expression tree as shown in FIG. 6 in order to determine which variables/arrays of the expression are inter-dependent of one another and thereby generate the clusters. Of course, in some embodiments, a statement may be expressed in a 3-address format (result, operator, and two operands), which is implicitly an expression tree, without explicit generation of an expression tree.

Figure 7B:
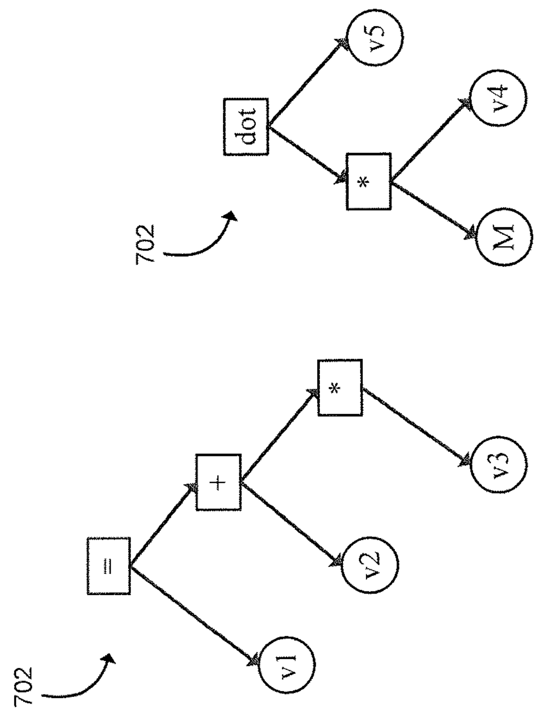
FIG. 7B is a simplified diagram of at least one embodiment of a set of expression subtrees generated from the expression tree of FIG. 7A.
Figure 7A:
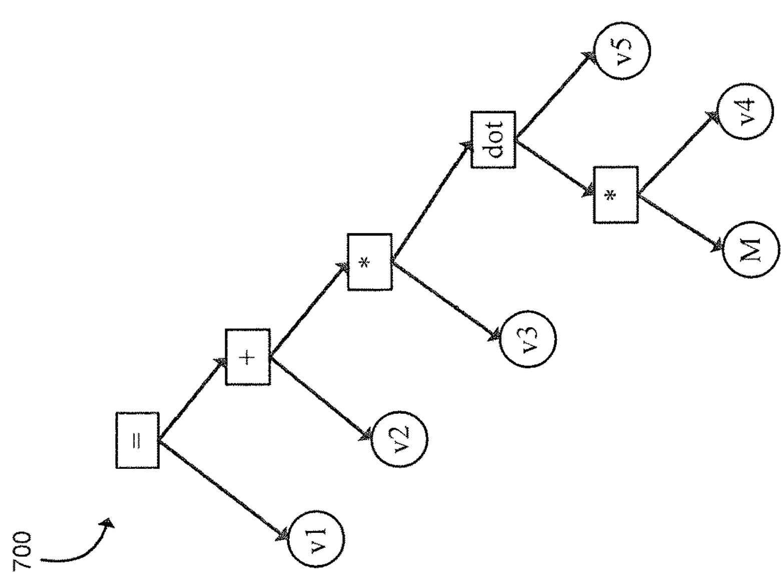
FIG. 7A is a simplified diagram of at least one embodiment of an expression tree.

Referring now to FIG. 6, the illustrative method 600 begins with block 602 in which the computing device 200 identifies and selects a statement/expression of the code region for analysis. By way of example, the code region may include an expression v1=v2+v3*dot(M*v4, v5) that is selected by the computing device 200, where v1, v2, v3, v4, and v5 are vectors, M is a matrix, and dot( ) is the dot product function. In block 604, the computing device 200 generates an expression tree for the selected statement/expression. In particular, the computing device 200 may generate an expression tree 700 as shown in FIG. 7A. As shown, the expression tree 700 includes a plurality of internal nodes and terminal nodes. In particular, in the illustrative embodiment, the expression tree 700 includes internal nodes that are indicative of operations (=, +, *, and dot( )) and include child nodes that are indicative of the operands of the corresponding operation. Additionally, the expression tree 700 includes terminal nodes that are indicative of variables/arrays and/or scalar constants (v1, v2, v3, v4, v5, and M). Although the exemplary expression, v1=v2+v3*dot(M*v4,v5), and therefore the expression tree 700, includes only binary operations, it should be appreciated that any particular expression and expression tree may include operations with a different number of operands in other embodiments (e.g., due to a ternary operator in the expression). As such, a particular operation node of the expression tree may include more or less than two child nodes in other embodiments.

In block 606, the computing device 200 breaks the expression tree into a plurality of subtrees 702 if possible. In doing so, in block 608, the computing device 200 may determine the result types of the internal nodes of the expression tree. In the illustrative embodiment, if an internal node's result type is a number, the edge between that node and its parent is broken to break the expression tree into two subtrees. If the internal node is a function, in some embodiments, the source code of the function may be analyzed to determine its result type. In other embodiment, the computing device 200 may rely on metadata of the function (e.g., received from a user of the computing device 200) to determine the result types for inter-dependent array analysis. In the illustrative embodiment, the expression tree and/or subtrees are broken down until the original expression tree cannot be broken into smaller subtrees. In the exemplary embodiment involving the expression tree 700, the dot (M*v4, v5) operation generates a scalar value. Accordingly, the expression tree 700 is broken into two subtrees 702 by breaking the link between the dot( ) node and its parent as shown in FIG. 7B.

In block 610 of FIG. 6, the computing device 200 generates or determines a set/cluster of inter-dependent arrays for each of the generated expression subtrees. In particular, in the illustrative embodiment, each of the arrays/variables in a particular subtree is included in a set/cluster associated with that particular subtree. For example, in the exemplary embodiment of FIGS. 7A-B, the arrays/variables v1, v2, and v3 of the first subtree 702 are included in a first cluster, and the arrays/variables v4, v5, and M of the second subtree are included in a second cluster. In block 612 of FIG. 6, the computing device 200 determines whether to analyze another statement/expression. For example, in the illustrative embodiment, the computing device 200 determines whether there are other expressions that have not been analyzed for inter-dependency of arrays of the expression. If the computing device 200 determines to analyze another expression, the method 600 returns to block 602 in which the computing device 200 identifies and selects another expression for analysis.

Referring back to FIG. 5, in block 518, the computing device 200 performs bi-directional data flow analysis on the identified code region in order to discover reorderable arrays in the code region. As described below, it should be appreciated that the computing device 200 may utilize forward and backward propagation functions, forward and backward transfer functions, and/or other functions in order to discover the reorderable arrays based, for example, on a provided first array to reorder (FAR). For example, a forward inter-dependent array propagation function may be defined according to $\overleftarrow{IA}(B,X)=\cup C$ for $\forall C\in B \ni X\cap C.RHS$ is nonempty, where $\overleftarrow{IA}(\,)$ is the forward propagation function, B is the expression, X is the set of input arrays to pass through, C is a cluster, and C.RHS is the right-hand side of a cluster (i.e., indicative of arrays used by the corresponding expression). Additionally, a backward inter-dependent array propagation function may be defined according to $\overrightarrow{IA}(B,X)=\cup C$ for $\forall C\in B \ni X\cap C.LHS$ is nonempty, where $\overrightarrow{IA}(\,)$ is the backward propagation function, and C.LHS is the left-hand side of a cluster (i.e., indicative of arrays defined by the corresponding expression).

For example, based on the exemplary expression v1=v2+v3*dot(M*v4, v5) described above, inter-dependent array analysis yields two clusters (e.g., based on the two subtrees 702): a first cluster {v1|v2, v3} and a second cluster {|M, v4, v5}, where | separates arrays/variables defined (i.e., in the left-hand side) from arrays/variables used (i.e., in the right-hand side).

By way of example, in such an embodiment, it should be appreciated that $\overleftarrow{IA}$(B, {v1})={ } because v1 is not included in the right-hand side of either the first cluster or the second cluster, $\overleftarrow{IA}$(B,{v2})={v1|v2, v3} because v2 is in the right-hand side of the first cluster, $\overleftarrow{IA}$(B, {v2, u})={v1|v2, v3} because v2 is in the right-hand side of the first cluster and u being in no cluster's right-hand side does not affect the result, $\overleftarrow{IA}$(B, {v2, v4})={v1|v2, v3, M, v4, v5} because v2 is in the first clusters right-hand side and v4 is in the second cluster's right-hand side, $\overrightarrow{IA}$(B, {v1})={v1|v2, v3} because v1 is in the first cluster's left-hand side, and $\overrightarrow{IA}$(B, {v1, v4})={v1|v2, v3} because v1 is in the first cluster's left-hand side and v4 being in no cluster's left-hand side does not affect the result.

In the illustrative embodiment, a forward transfer function may be defined according to f(B,X)=$\overleftarrow{IA}$(B,X∩use(B))∪(X−def(B)−use(B)) where $\overleftarrow{IA}$( ) is the forward propagation function, B is the expression, X a set of reorderable arrays to pass through, def(B) is the set of arrays defined in the statement B, and use(B) is the set of arrays used in the statement B. It should be appreciated that the forward transfer function is indicative of passing from before the statement B to after it through the statement's right-hand side and left-hand side in order. It should further be appreciated that there are two cases that may occur during propagation through the statement B with the forward transfer function for which further "growth" may occur: arrays that satisfy the first term $\overleftarrow{IA}$(B,X∩use(B))) and arrays that satisfy the second term (X−def (B)−use(B)). As such, if an input array in X is used by the statement B, then the new set of reorderable arrays includes all of the clusters with the array in the right-hand side of the cluster. It should be appreciated that the first statement reflects that a reordered array in the right-hand side of an expression may necessitate the reordering of each other array in the same cluster. Further, if the input array is neither used nor defined by the expression B, then the array is also included in the new set of reordered arrays. In other words, if an input reordered array is passed through and neither affects nor is affected by any of the arrays of expression B, then the reordered input array should stay reordered subsequent to the expression.

A backward transfer function may be defined according to b(B,X)=$\overrightarrow{IA}$(B,X∩def (B)).RHS∪$\overleftarrow{IA}$(B, (X−def (B))∩use (B)).RHS∩(X−def (B)−use(B)) where $\overleftarrow{IA}$( ) is the forward propagation function, $\overrightarrow{IA}$( ) is the backward propagation function, B is the expression, X a set of reorderable arrays to pass through, def (B) is the set of arrays defined in the statement B, use(B) is the set of arrays used in the statement B, and .RHS defines the right-hand side of the cluster. It should be appreciated that the backward transfer function is indicative of passing from after the statement B to before it through the statement's left-hand side and right-hand side in order. Additionally, it should further be appreciated there are three cases that may occur during propagation through the statement B with the backward transfer function for which further "growth" may occur: arrays that satisfy the first term $\overrightarrow{IA}$(B,X∩def (B)).RHS, arrays that satisfy the second term $\overleftarrow{IA}$(B, (X−def (B))∩use(B)).RHS, or arrays that satisfy the third term (X−def (B)−use(B)).

Figure 8:
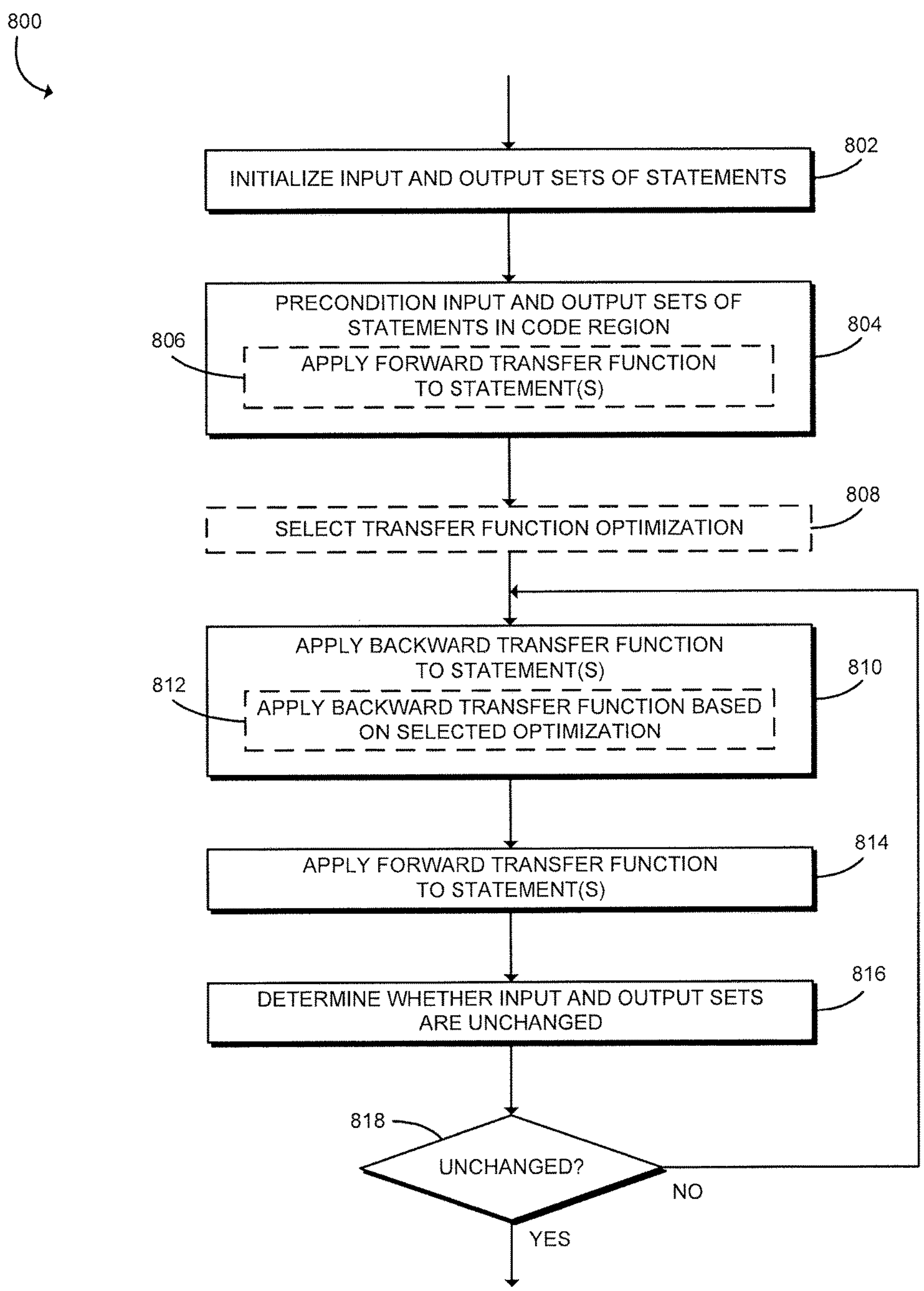
FIG. 8 is a simplified flow diagram of at least one embodiment of a method for performing bi-directional data flow analysis that may be executed by the computing device of FIG. 2.

In some embodiments, the computing device 200 may execute a method 800 to perform bi-directional data flow analysis as shown in FIG. 8. In some embodiments, the bi-directional data flow analysis works on a Control-Flow Graph (CFG) in which each block B is a statement/expression. The illustrative method 800 beings with block 802 in which the computing device 200 initializes an input and output set/state of the statements/expressions in the code region. In order to do so, the input and output set of any statement/expression outside the code region may first be initialized to the empty set. Additionally, for each region entry, the output set is initialized to the first array to reorder (FAR) in the illustrative embodiment. As indicated above, the FAR may be provided by a user of the computing device 200 or otherwise determined by the compiler 314. For other statements in the code region, the output set may be initialized to the universal sets. In some embodiments, the input sets of the statements in the code region are not initialized as they may be automatically instantiated in subsequent steps. More formally, in some embodiments, all statements B outside the code region may be initialized according to In[B]=Out[B]=ϕ where In[B] is the input set and Out[B] is the output set, and all statements inside the code region may be initialized such that Out[B]=FAR[B] if B is an entry and Out[B] is equal to the universal set otherwise.

In block 804, the computing device 200 preconditions the input and output sets of the statements in the code region. To do so, in block 806, the computing device 200 may apply the forward transfer function to the statements. As such, it should be appreciated that for each statement B, the input set In[B] includes the arrays that are reorderable after every predecessor of it, and the output set Out[B] is the result of propagating In[B] through the statement B based on the forward transfer function, which may be repeated until there is no change to the input and output sets. More formally, in some embodiments, all statements B in the code region for which B is not an entry of the code region may be preconditioned according to In[B]=$\cap_{\forall P \in preds(B)}$Out[P] and Out[B]=f(B, In[B]) where pred( ) is the set of predecessor expressions of B.

In some embodiments, in block 808, the computing device 200 may select a transfer function optimization (e.g., for the backward transfer function). In particular, in the illustrative embodiment, the computing device 200 may apply the backward transfer function without an optimization, with an optimization based on the liveness of the arrays, or with an optimization based on the execution frequency of various expressions in the code region.

In block 810, the computing device 200 applies the backward transfer function to the statements in the code region. In doing so, in block 812, the computing device 200 may apply the backward transfer function based on the selected optimization. In the illustrative embodiment, the backward transfer function may enlarge Out[B] by adding arrays that are reorderable before every successor of it, and/or In[B] may be enlarged by adding arrays that are a result of propagating Out[B] through B based on the particular backward transfer function. In embodiments in which the liveness optimization is employed, if a variable is "dead" prior to a successor (i.e., not used in any execution path through the successor), then it can be artificially reordered before the successor because doing so does not affect the program semantics (e.g., the array is unused at that point anyway). In embodiments in which the execution frequency optimization is employed, if a statement B has more than one successor block and the execution frequency are significantly different (e.g., based on a predetermined threshold), then the most frequent successor x may always allow the reorderable arrays in In[x] to be propagated to Out[B]. For example, if a particular successor x is within a loop and all others are outside a loop, then propagation of that successor x may avoid insertion of reordering of arrays between the statements B and x; of course, in some embodiments, it may be necessary to insert reverse-reordering functions of one or more of those arrays between B and the successors other than x. More formally, in some embodiments, for all statements B in the region, the backward transfer function may be applied according to In[B]=In[B]∪b(B,Out[B]) and one of $$\mathrm{Out}[B] = \mathrm{Out}[B] \cup \bigcap_{\forall S \in succs(B)} (\mathrm{In}[S] \cup \mathrm{Dead}[S])$$

if the liveness optimization is employed, $$\mathrm{Out}[B] = \mathrm{Out}[B] \cup \left( \bigcap_{\forall S \in succs(B)} \mathrm{In}[S] \right) \cup \mathrm{Frequent}[B]$$

if the execution frequency optimization is employed, or $$\mathrm{Out}[B] = \mathrm{Out}[B] \cup \bigcap_{\forall S \in succs(B)} \mathrm{In}[S]$$

if no optimization is employed, where succs(B) is the set of all successors of the statement B, Dead[S]=$\cup_{\forall S \in succs(B)}$In[x]−LiveIn[S], Frequent[B]=In[x] with x∈succs(B) and executes most frequently among all successors of B, Dead[S] is a set of variables/arrays that are dead before a successor S but not dead before other successors (i.e., they are "partially dead" among all successors), and LiveIn[S] is a set of variables/arrays that are live before a successor S.

In block 814, the computing device 200 applies the forward transfer function to the statements in the code region. It should be appreciated that the application for the forward transfer function is similar to that described above with respect to preconditioning; however, In[B] and Out[B] keep their original values and "grow" with the new arrays. More formally, in some embodiments, for all of the statements B in the code region, the forward transfer function may be applied according to In[B]=In[B]∪$\cap_{\forall P \in preds(B)}$Out[P] and Out[B]=Out[B]∪f(B, In[B]). In block 818, the computing device 200 determines whether the input and output sets are unchanged. If not, the method 800 returns to block 810 in which the backward transfer function is again applied to the statements. In other words, the backward and forward transfer functions are iteratively applied until the input and output sets are unchanged and stabilized.

Referring back to FIG. 5, in block 520, the computing device 200 transforms the program code based on the discovered reorderable arrays. In particular, the computing device 200 is configured to reorder and/or reverse-reorder one or more arrays in the code region and/or within the vicinity of the code region in the program code (e.g., immediately prior to or subsequent to the code region). As indicated above, the computing device 200 may utilize any suitable technique to effect the transformation of the program code itself. In some embodiments, for any statement B1 in the code region, if there is an edge (e.g., in a control flow graph (CFG)) from the statement B1 to a subsequent statement B2, where B2 is, for example, another block in the CFG, then for every variable/array x∈LiveIn[B2], if x∉Out[B1] but x∈In[B2] then the program code "x=reorder(x)" may be inserted at that edge and if x∈Out[B1] but x∈In[B2] then the program code "x=reverse_reorder(x)" may be inserted at that edge. In embodiments in which the statement B2 is an entry of the code region, for every variable/array x∈LiveIn[B2], if x∈In[B2] then the program code "x=reorder(x)" may be inserted before B2.

It should be appreciated that, in some embodiments, any one or more of the methods 400, 500, 600, and/or 800 may be embodied as various instructions stored on a computer-readable media, which may be executed by the processor 210 and/or other components of the computing device 200 to cause the computing device 200 to perform the respective method 400, 500, 600, and/or 800. The computer-readable media may be embodied as any type of media capable of being read by the computing device 200 including, but not limited to, the memory 214, the data storage 216, other memory or data storage devices of the computing device 200, portable media readable by a peripheral device 220 of the computing device 200, and/or other media.

A partial table 900 depicts the results from the application of bi-directional analysis to a simple code region including only two statements/blocks: B1: F=E and B2:H=F+G. As shown, during the initialization phase, the output set of B1 is assigned the first array to discover (FAR), which is {F} in this particular embodiment (e.g., selected by the user), and the output set of B2 is assigned the universal set. During preconditioning, the computing device 200 applies a forward pass 902 of the forward transfer function as described above, which results in B2 being assigned an output set of {F, G, H}. As shown, an input set of the statement B2 is the same as the output set of the statement B1, because there are no statements between B1 and B2 to change the set. The computing device 200 subsequently applies a backward pass 904 of the backward transfer function, which results in B2 having an input set of {F, G} and B1 having an output set of {F, G} and an input set of {E, G}. As shown, in such an embodiment, the computing device 200 iteratively applies the backward transfer function and the forward transfer function until the input and output sets of each of the statements B1 and B2 is unchanged.

Figure 10:
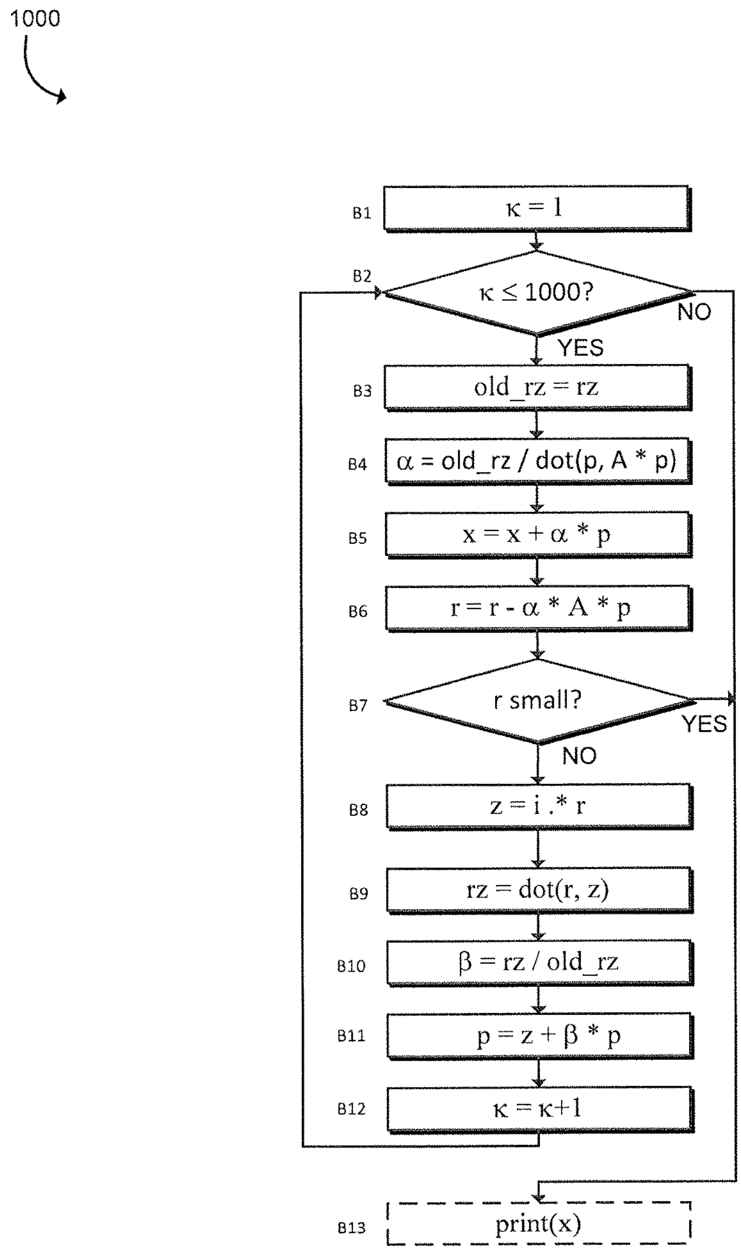
FIG. 10 is a simplified block diagram of program code in a code region.
Figure 12:
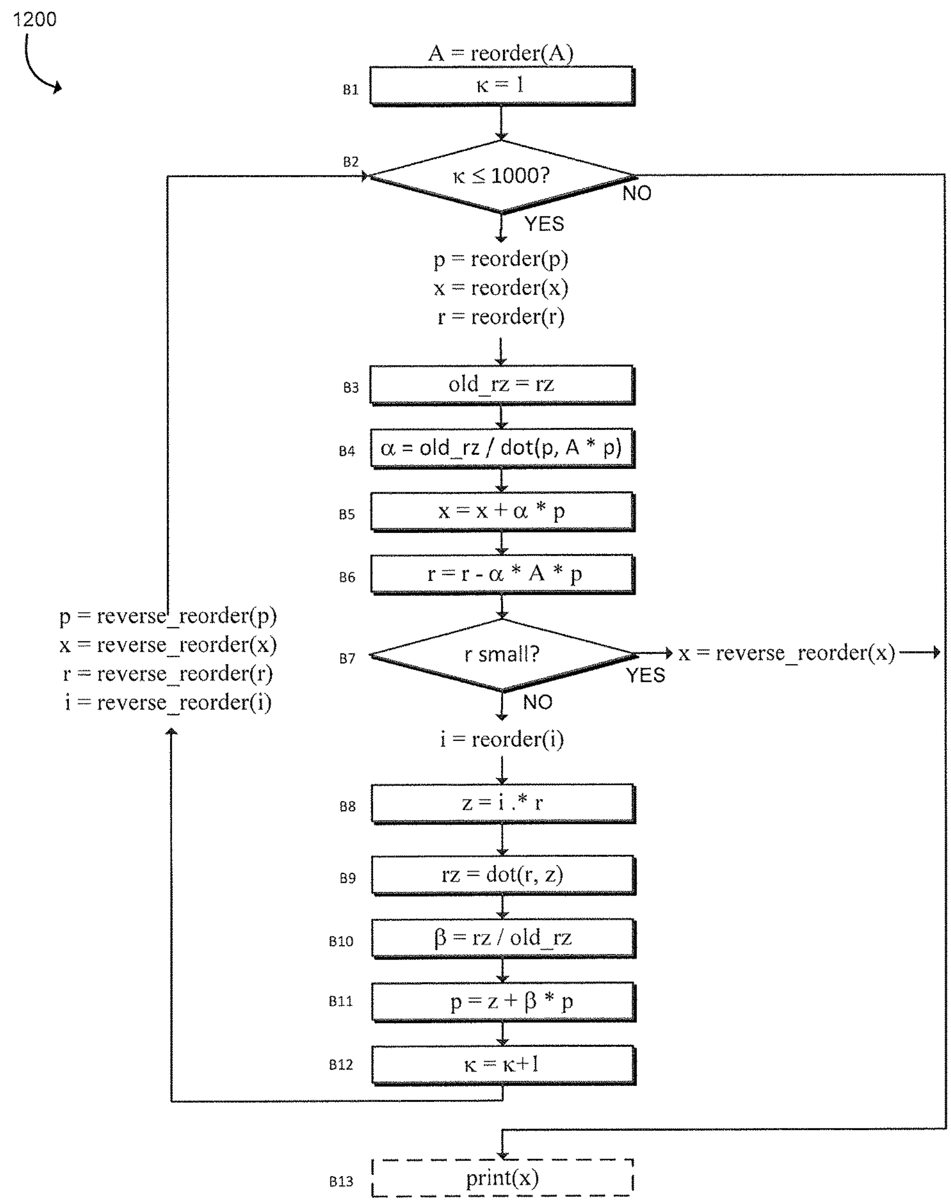
FIG. 12 is a simplified block diagram of a reordered version of the program code of FIG. 10 based on the results of the bi-directional analysis without optimization of FIG. 11.
Figure 14:
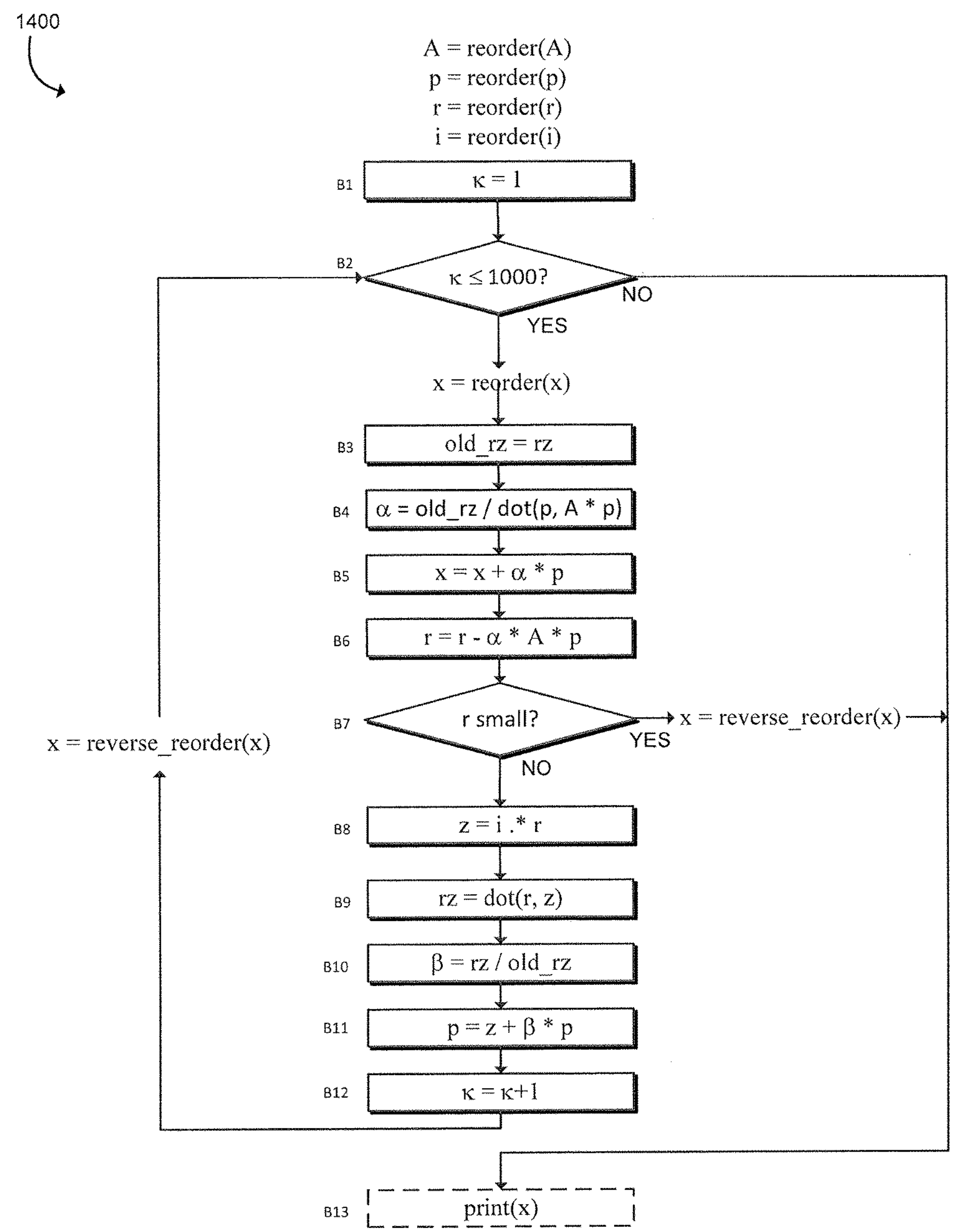
FIG. 14 is a simplified block diagram of a reordered version of the program code of FIG. 10 based on the results of the bi-directional analysis with the optimization based on liveness of FIG. 13.
Figure 16:
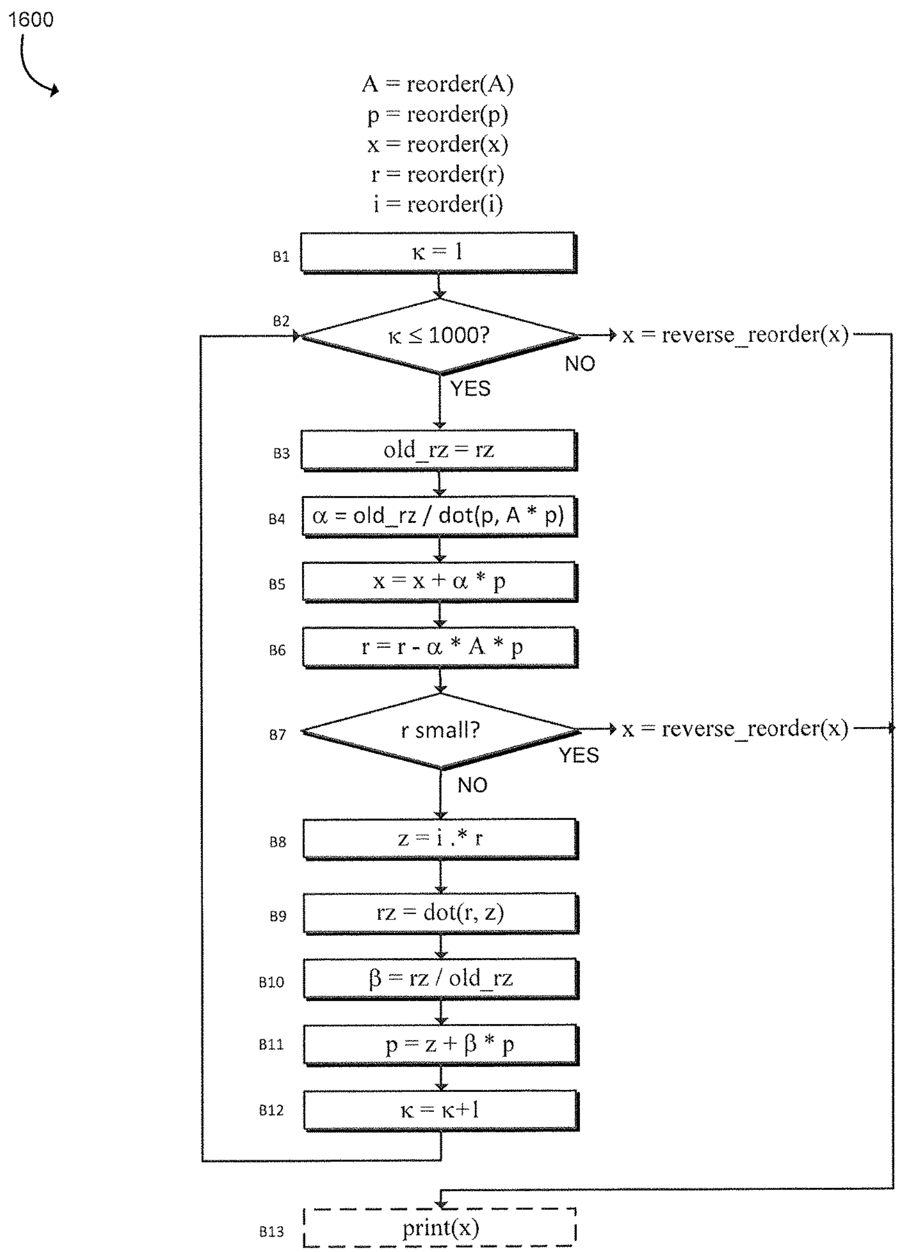
FIG. 16 is a simplified block diagram of a reordered version of the program code of FIG. 10 based on the results of the bi-directional analysis with the optimization based on execution frequency of FIG. 15.

Referring now to FIG. 10, a control flow graph 1000 depicting a code region identified from the program code is shown. As shown, the graph 1000 includes a plurality of blocks B1-B13 that depict various statements of the program code. In the illustrative embodiment, the identified code region includes the blocks B1-B12, whereas the block B13 is outside of the code region. It should be appreciated that FIGS. 11-16 depict the result from the application of the various bi-directional flow analysis algorithms (i.e., with and without optimization) and the resultant transformed program code. It should be further appreciated that although the resultant transformation code from the application of one bi-directional flow analysis algorithm (e.g. with optimization) may be viewed as the consequence of hoisting/moving some statements in the resultant transformation code from the application of another bi-directional flow analysis algorithm (e.g. without optimization), there may be no need to do so with the techniques described herein. In some embodiments, each resultant transformed code may be generated only based on the result of the corresponding bi-directional flow analysis algorithm.

A partial table 1100 of results from the application of bi-directional analysis to the program code of FIG. 10 without optimizations is shown in FIG. 11. It should be appreciated that the partial table 1100 (and the tables 1300 and 1500 described below) include only the initialization, preconditioning, and first backward pass phases described herein. However, in practice, the entire table may be completed based on the techniques described herein. As shown in a control flow graph 1200 of FIG. 12 corresponding with the table 1100, the program code is transformed to reorder and reverse-reorder variables/arrays (e.g., p, x, r, and i) at various programming points within the code region.

As described above, in some embodiments, the bi-directional flow analysis may be optimized to account for variable liveness. The results of applying bi-directional flow analysis with such an optimization is partially shown in a table 1300 of FIG. 13 and the corresponding transformed program code in shown in a control flow graph 1400 of FIG. 14. As shown and described above, reordering functions associated with "partially dead" variables (e.g., A, p, r, and i) are moved from within the code region to prior to the code region for more efficient execution. In yet other embodiments, the bi-directional flow analysis may be optimized to account for execution frequency as described above. The results of applying bi-directional flow analysis with such an optimization is partially shown in a table 1500 of FIG. 15 and the corresponding transformed program code is depicted in a control flow graph 1600 of FIG. 16. As shown and described above, reordering functions that occur within a frequently execution region of the program code or, more specifically, of the code region (e.g., a loop) may be moved outside of the loop (e.g., prior to the loop and/or the code region) to improve execution. In such embodiments, however, it may be necessary (e.g., in circumstances where there are conditional statements in the program code) to place additional reverse-reorder functions within the code region. For example, in the illustrative embodiment, a reverse-reorder function is included between the statement B2 and B13 to ensure the arrays/variables output to the "print(x)" statement following the code region are accurate.

EXAMPLES

Illustrative examples of the technologies disclosed herein are provided below. An embodiment of the technologies may include any one or more, and any combination of, the examples described below.

Example 1 includes a computing device for automatic reordering of sparse matrices, the computing device comprising a distributivity analysis module to determine a distributivity of an expression defined in a code region of a program code, wherein the expression is determined to be distributive if semantics of the expression are unaffected by a reordering of an input or output of the expression; an inter-dependent array analysis module to perform inter-dependent array analysis on the expression to determine one or more clusters of inter-dependent arrays of the expression, wherein each array of a cluster of the one or more clusters is inter-dependent on each other array of the cluster; and a reorderable array discovery module to perform bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function.

Example 2 includes the subject matter of Example 1, and further including a region identification module to identify the code region of the program code.

Example 3 includes the subject matter of any of Examples 1 and 2, and wherein to identify the code region comprises to identify a linear loop region of the program code that includes code within a body of the loop and includes no flow control statements.

Example 4 includes the subject matter of any of Examples 1-3, and wherein to identify the code region comprises to identify the code region by a compiler of the computing device.

Example 5 includes the subject matter of any of Examples 1-4, and wherein to identify the code region comprises to identify a code region to be executed by the computing device for at least a threshold period of time.

Example 6 includes the subject matter of any of Examples 1-5, and wherein the region identification module is further to receive the program code by a compiler of the computing device.

Example 7 includes the subject matter of any of Examples 1-6, and wherein to determine the distributivity of the expression comprises to determine the distributivity of each expression defined in the code region.

Example 8 includes the subject matter of any of Examples 1-7, and wherein to perform the inter-dependent array analysis comprises to perform the inter-dependent array analysis in response to a determination that each expression is distributive.

Example 9 includes the subject matter of any of Examples 1-8, and wherein to determine the distributivity of the expression comprises to determine that a statement, $R(\varepsilon(i_{1, \ldots, n}))=\varepsilon(R(i_1), \ldots, R(i_n))$, wherein ε is the expression; wherein R is a reordering over the expression; and wherein $i_{1, \ldots, n}$ is a set of inputs.

Example 10 includes the subject matter of any of Examples 1-9, and wherein to determine the distributivity of the expression comprises to determine the expression to be non-distributive in response to a determination that at least one of (i) the expression requires an input or output structure to have a specific shape, (ii) the expression defines an input-output function of the program code, (iii) the expression requires bitwise reproducibility, or (iv) the expression includes a function unknown to a compiler of the computing device.

Example 11 includes the subject matter of any of Examples 1-10, and wherein each array of a cluster of the one or more clusters is inter-dependent on each other array of the cluster such that a reordering of one array in a particular cluster of the one or more clusters affects each other array of the particular cluster.

Example 12 includes the subject matter of any of Examples 1-11, and wherein to perform the inter-dependent array analysis comprises to generate an expression tree for the expression, wherein each internal node of the expression tree is indicative of an operation of the expression and each terminal node of the expression tree is indicative of an array or scalar; break the expression tree into a set of expression subtrees based on inter-dependency of the arrays; and determine a corresponding cluster of inter-dependent arrays for each expression subtree based on the arrays included in the expression subtree.

Example 13 includes the subject matter of any of Examples 1-12, and wherein to break the expression tree into the set of expression subtrees comprises to determine a result type of each internal node of the expression tree.

Example 14 includes the subject matter of any of Examples 1-13, and wherein to perform the bi-directional data flow analysis comprises to initialize an input set and an output set of the expression; precondition the input set and the output set of the expression by an application of the forward transfer function to a first array to reorder; and apply iteratively the backward transfer function and the forward transfer function until the input set and the output set are unchanged.

Example 15 includes the subject matter of any of Examples 1-14, and wherein the reorderable array discovery module is further to receive the first array to reorder from a user of the computing device.

Example 16 includes the subject matter of any of Examples 1-15, and wherein to apply iteratively the backward transfer function and the forward transfer function comprises to apply iteratively the backward transfer function and the forward transfer function until an input set and an output set of each expression is unchanged.

Example 17 includes the subject matter of any of Examples 1-16, and further including a code transformation module to transform the program code based on the bi-directional data flow analysis to reorder at least one array.

Example 18 includes the subject matter of any of Examples 1-17, and further including a liveness analysis module to determine a liveness of each variable in the code region at each statement within the code region.

Example 19 includes a method of automatic reordering of sparse matrices, the method comprising determining, by a computing device, a distributivity of an expression defined in a code region of a program code, wherein the expression is determined to be distributive if semantics of the expression are unaffected by a reordering of an input or output of the expression; performing, by the computing device, inter-dependent array analysis on the expression to determine one or more clusters of inter-dependent arrays of the expression, wherein each array of a cluster of the one or more clusters is inter-dependent on each other array of the cluster; and performing, by the computing device, bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function.

Example 20 includes the subject matter of Example 19, and further including identifying, by the computing device, the code region of the program code.

Example 21 includes the subject matter of any of Examples 19 and 20, and wherein identifying the code region comprises identifying a linear loop region of the program code that includes code within a body of the loop and includes no flow control statements.

Example 22 includes the subject matter of any of Examples 19-21, and wherein identifying the code region comprises identifying the code region by a compiler of the computing device.

Example 23 includes the subject matter of any of Examples 19-22, and wherein identifying the code region comprises identifying a code region to be executed by the computing device for at least a threshold period of time.

Example 24 includes the subject matter of any of Examples 19-23, and further including receiving the program code by a compiler of the computing device.

Example 25 includes the subject matter of any of Examples 19-24, and wherein determining the distributivity of the expression comprises determining the distributivity of each expression defined in the code region.

Example 26 includes the subject matter of any of Examples 19-25, and wherein performing the inter-dependent array analysis comprises performing the inter-dependent array analysis in response to determining each expression is distributive.

Example 27 includes the subject matter of any of Examples 19-26, and wherein determining the distributivity of the expression comprises determining that a statement, $R(\varepsilon(i_{1, \ldots, n}))=\varepsilon(R(i_1), \ldots, R(i_n))$, wherein $\varepsilon$ is the expression; wherein R is a reordering over the expression; and wherein $i_{1, \ldots, n}$ is a set of inputs.

Example 28 includes the subject matter of any of Examples 19-27, and wherein determining the distributivity of the expression comprises determining the expression to be non-distributive in response to a determination that at least one of (i) the expression requires an input or output structure to have a specific shape, (ii) the expression defines an input-output function of the program code, (iii) the expression requires bitwise reproducibility, or (iv) the expression includes a function unknown to a compiler of the computing device.

Example 29 includes the subject matter of any of Examples 19-28, and wherein each array of a cluster of the one or more clusters is inter-dependent on each other array of the cluster such that a reordering of one array in a particular cluster of the one or more clusters affects each other array of the particular cluster.

Example 30 includes the subject matter of any of Examples 19-29, and wherein performing the inter-dependent array analysis comprises generating an expression tree for the expression, wherein each internal node of the expression tree is indicative of an operation of the expression and each terminal node of the expression tree is indicative of an array or scalar; breaking the expression tree into a set of expression subtrees based on inter-dependency of the arrays; and determining a corresponding cluster of inter-dependent arrays for each expression subtree based on the arrays included in the expression subtree.

Example 31 includes the subject matter of any of Examples 19-30, and wherein breaking the expression tree into the set of expression subtrees comprises determining a result type of each internal node of the expression tree.

Example 32 includes the subject matter of any of Examples 19-31, and wherein performing the bi-directional data flow analysis comprises initializing an input set and an output set of the expression; preconditioning the input set and the output set of the expression by applying the forward transfer function to a first array to reorder; and applying iteratively the backward transfer function and the forward transfer function until the input set and the output set are unchanged.

Example 33 includes the subject matter of any of Examples 19-32, and further including receiving, by the computing device, the first array to reorder from a user of the computing device.

Example 34 includes the subject matter of any of Examples 19-33, and wherein applying iteratively the backward transfer function and the forward transfer function comprises applying iteratively the backward transfer function and the forward transfer function until an input set and an output set of each expression is unchanged.

Example 35 includes the subject matter of any of Examples 19-34, and further including transforming the program code based on the bi-directional data flow analysis to reorder at least one array.

Example 36 includes the subject matter of any of Examples 19-35, and further including determining, by the computing device, a liveness of each variable in the code region at each statement within the code region.

Example 37 includes a computing device comprising a processor; and a memory having stored therein a plurality of instructions that when executed by the processor cause the computing device to perform the method of any of Examples 19-36.

Example 38 includes one or more machine-readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for automatic reordering of sparse matrices, the computing device comprising means for determining a distributivity of an expression defined in a code region of a program code, wherein the expression is determined to be distributive if semantics of the expression are unaffected by a reordering of an input or output of the expression; means for performing inter-dependent array analysis on the expression to determine one or more clusters of inter-dependent arrays of the expression, wherein each array of a cluster of the one or more clusters is inter-dependent on each other array of the cluster; and means for performing bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function.

Example 41 includes the subject matter of Example 40, and further including means for identifying the code region of the program code.

Example 42 includes the subject matter of any of Examples 40 and 41, and wherein the means for identifying the code region comprises means for identifying a linear loop region of the program code that includes code within a body of the loop and includes no flow control statements.

Example 43 includes the subject matter of any of Examples 40-42, and wherein the means for identifying the code region comprises means for identifying the code region by a compiler of the computing device.

Example 44 includes the subject matter of any of Examples 40-43, and wherein the means for identifying the code region comprises means for identifying a code region to be executed by the computing device for at least a threshold period of time.

Example 45 includes the subject matter of any of Examples 40-44, and further including means for receiving the program code by a compiler of the computing device.

Example 46 includes the subject matter of any of Examples 40-45, and wherein the means for determining the distributivity of the expression comprises means for determining the distributivity of each expression defined in the code region.

Example 47 includes the subject matter of any of Examples 40-46, and wherein the means for performing the inter-dependent array analysis comprises means for performing the inter-dependent array analysis in response to determining each expression is distributive.

Example 48 includes the subject matter of any of Examples 40-47, and wherein the means for determining the distributivity of the expression comprises means for determining that a statement, $R(\varepsilon(i_{1,\ldots,n}))=\varepsilon(R(i_1), \ldots, R(i_n))$, wherein $\varepsilon$ is the expression; wherein R is a reordering over the expression; and wherein $i_{1,\ldots,n}$ is a set of inputs.

Example 49 includes the subject matter of any of Examples 40-48, and wherein the means for determining the distributivity of the expression comprises means for determining the expression to be non-distributive in response to a determination that at least one of (i) the expression requires an input or output structure to have a specific shape, (ii) the expression defines an input-output function of the program code, (iii) the expression requires bitwise reproducibility, or (iv) the expression includes a function unknown to a compiler of the computing device.

Example 50 includes the subject matter of any of Examples 40-49, and wherein each array of a cluster of the one or more clusters is inter-dependent on each other array of the cluster such that a reordering of one array in a particular cluster of the one or more clusters affects each other array of the particular cluster.

Example 51 includes the subject matter of any of Examples 40-50, and wherein the means for performing the inter-dependent array analysis comprises means for generating an expression tree for the expression, wherein each internal node of the expression tree is indicative of an operation of the expression and each terminal node of the expression tree is indicative of an array or scalar; means for breaking the expression tree into a set of expression subtrees based on inter-dependency of the arrays; and means for determining a corresponding cluster of inter-dependent arrays for each expression subtree based on the arrays included in the expression subtree.

Example 52 includes the subject matter of any of Examples 40-51, and wherein the means for breaking the expression tree into the set of expression subtrees comprises means for determining a result type of each internal node of the expression tree.

Example 53 includes the subject matter of any of Examples 40-52, and wherein the means for performing the bi-directional data flow analysis comprises means for initializing an input set and an output set of the expression; means for preconditioning the input set and the output set of the expression by applying the forward transfer function to a first array to reorder; and means for applying iteratively the backward transfer function and the forward transfer function until the input set and the output set are unchanged.

Example 54 includes the subject matter of any of Examples 40-53, and further including means for receiving the first array to reorder from a user of the computing device.

Example 55 includes the subject matter of any of Examples 40-54, and wherein the means for applying iteratively the backward transfer function and the forward transfer function comprises means for applying iteratively the backward transfer function and the forward transfer function until an input set and an output set of each expression is unchanged.

Example 56 includes the subject matter of any of Examples 40-55, and further including means for transforming the program code based on the bi-directional data flow analysis to reorder at least one array.

Example 57 includes the subject matter of any of Examples 40-56, and further including means for determining a liveness of each variable in the code region at each statement within the code region.

The invention claimed is:

1. A computing device including a memory and one or more processors in communication with the memory for automatic reordering of sparse matrices, the computing device comprising:

a distributivity analysis module to determine a distributivity of an expression defined in a code region of a program code, wherein the expression is determined to be distributive if semantics of the expression are unaffected by a reordering of an input or output of the expression and wherein the expression is determined to be non-distributive in response to a determination that at least one of (i) the expression requires bitwise reproducibility or (ii) the expression includes a function unknown to a compiler of the computing device;

a liveness analysis module to determine a liveness of one or more variables in the code region, wherein the liveness of a given variable is indicative of whether the variable is used in a programming point in the program code subsequent to a programming point corresponding to the code region;

an inter-dependent array analysis module to perform inter-dependent array analysis on the expression to determine one or more clusters of inter-dependent arrays of the expression, wherein each array of a cluster of the one or more clusters is inter-dependent on each other array of the cluster and wherein the inter-dependent array analysis is performed in response to a determination that each expression defined in the code region is distributive;

a reorderable array discovery module to perform bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function and wherein the bi-directional data flow analysis is optimized based on the determined liveness of the one or more variables in the code region; and a code transformation module to transform the program code based on the bi-directional data flow analysis to reorder at least one array.

2. The computing device of claim 1, further comprising a region identification module to identify the code region of the program code.

3. The computing device of claim 2, wherein to identify the code region comprises to identify a linear loop region of the program code that includes code within a body of the loop and includes no flow control statements.

4. The computing device of claim 2, wherein to identify the code region comprises to identify a code region to be executed by the computing device for at least a threshold period of time.

5. The computing device of claim 1, wherein to determine the distributivity of the expression comprises to determine the distributivity of each expression defined in the code region.

6. The computing device of claim 1, wherein to determine the distributivity of the expression comprises to determine that a statement, $R(\varepsilon(i_{1,\ldots,n}))=\varepsilon(R(i_1), \ldots, R(i_n))$, wherein $\varepsilon$ is the expression;

wherein R is a reordering over the expression; and wherein $i_{1,\ldots,n}$ is a set of inputs.

7. The computing device of claim 1, wherein to determine the distributivity of the expression further comprises to determine the expression to be non-distributive in response to a determination that at least one of (i) the expression requires an input or output structure to have a specific shape or (ii) the expression defines an input-output function of the program code.

8. The computing device of claim 1, wherein each array of a cluster of the one or more clusters is inter-dependent on each other array of the cluster such that a reordering of one array in a particular cluster of the one or more clusters affects each other array of the particular cluster.

9. The computing device of claim 1, wherein to perform the inter-dependent array analysis comprises to:

generate an expression tree for the expression, wherein each internal node of the expression tree is indicative of an operation of the expression and each terminal node of the expression tree is indicative of an array or scalar;

break the expression tree into a set of expression subtrees based on inter-dependency of the arrays; and determine a corresponding cluster of inter-dependent arrays for each expression subtree based on the arrays included in the expression subtree.

10. The computing device of claim 9, wherein to break the expression tree into the set of expression subtrees comprises to determine a result type of each internal node of the expression tree.

11. The computing device of claim 1, wherein to perform the bi-directional data flow analysis comprises to:

initialize an input set and an output set of the expression;

precondition the input set and the output set of the expression by an application of the forward transfer function to a first array to reorder; and apply iteratively the backward transfer function and the forward transfer function until the input set and the output set are unchanged.

12. The computing device of claim 11, wherein the reorderable array discovery module is further to receive the first array to reorder from a user of the computing device.

13. The computing device of claim 11, wherein to apply iteratively the backward transfer function and the forward transfer function comprises to apply iteratively the backward transfer function and the forward transfer function until an input set and an output set of each expression is unchanged.

14. One or more non-transitory machine-readable storage media comprising a plurality of instructions stored thereon that, in response to execution by a computing device, cause the computing device to:

determine a distributivity of an expression defined in a code region of a program code, wherein the expression is determined to be distributive if semantics of the expression are unaffected by a reordering of an input or output of the expression and wherein the expression is determined to be non-distributive in response to a determination that at least one of (i) the expression requires bitwise reproducibility or (ii) the expression includes a function unknown to a compiler of the computing device;

determine a liveness of one or more variables in the code region, wherein the liveness of a given variable is indicative of whether the variable is used in a programming point in the program code subsequent to a programming point corresponding to the code region;

perform inter-dependent array analysis on the expression to determine one or more clusters of inter-dependent arrays of the expression, wherein each array of a cluster of the one or more clusters is inter-dependent on each other array of the cluster and wherein the inter-dependent array analysis is performed in response to a determination that each expression defined in the code region is distributive;

perform bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function and wherein the bi-directional data flow analysis is optimized based on the determined liveness of the one or more variables in the code region; and transform the program code based on the bi-directional data flow analysis to reorder at least one array.

15. The one or more non-transitory machine-readable storage media of claim 14, wherein to determine the distributivity of the expression comprises to determine the distributivity of each expression defined in the code region.

16. The one or more non-transitory machine-readable storage media of claim 14, wherein to determine the distributivity of the expression comprises to determine that a statement, $R(\varepsilon(i_{1,\ldots,n}))=\varepsilon(R(i_1), \ldots, R(i_n))$, wherein $\varepsilon$ is the expression;

wherein R is a reordering over the expression; and wherein $i_{1,\ldots,n}$ is a set of inputs.

17. The one or more non-transitory machine-readable storage media of claim 14, wherein each array of a cluster of the one or more clusters is inter-dependent on each other array of the cluster such that a reordering of one array in a particular cluster of the one or more clusters affects each other array of the particular cluster.

18. The one or more non-transitory machine-readable storage media of claim 14, wherein to perform the inter-dependent array analysis comprises to:

generate an expression tree for the expression, wherein each internal node of the expression tree is indicative of an operation of the expression and each terminal node of the expression tree is indicative of an array or scalar;

break the expression tree into a set of expression subtrees based on inter-dependency of the arrays; and determine a corresponding cluster of inter-dependent arrays for each expression subtree based on the arrays included in the expression subtree.

19. The one or more non-transitory machine-readable storage media of claim 14, wherein to perform the bi-directional data flow analysis comprises to:

initialize an input set and an output set of the expression;

precondition the input set and the output set of the expression by application of the forward transfer function to a first array to reorder; and apply iteratively the backward transfer function and the forward transfer function until the input set and the output set are unchanged.

20. The one or more non-transitory machine-readable storage media of claim 19, wherein to apply iteratively the backward transfer function and the forward transfer function comprises to apply iteratively the backward transfer function and the forward transfer function until an input set and an output set of each expression is unchanged.

21. A computer-implemented method of automatic reordering of sparse matrices, the method comprising:

determining, by a computing device, a distributivity of an expression defined in a code region of a program code, wherein the expression is determined to be distributive if semantics of the expression are unaffected by a reordering of an input or output of the expression and wherein the expression is determined to be non-distributive in response to a determination that at least one of (i) the expression requires bitwise reproducibility or (ii) the expression includes a function unknown to a compiler of the computing device;

determining a liveness of one or more variables in the code region, wherein the liveness of a given variable is indicative of whether the variable is used in a programming point in the program code subsequent to a programming point corresponding to the code region;

performing, by the computing device, inter-dependent array analysis on the expression to determine one or more clusters of inter-dependent arrays of the expression, wherein each array of a cluster of the one or more clusters is inter-dependent on each other array of the cluster and wherein the inter-dependent array analysis is performed in response to a determination that each expression defined in the code region is distributive;

performing, by the computing device, bi-directional data flow analysis on the code region by iterative backward propagation and forward propagation of reorderable arrays through the expressions in the code region based on the one or more clusters of the inter-dependent arrays, wherein the backward propagation is based on a backward transfer function and the forward propagation is based on a forward transfer function and wherein the bi-directional data flow analysis is optimized based on the determined liveness of the one or more variables in the code region; and transforming the program code based on the bi-directional data flow analysis to reorder at least one array.

22. The method of claim 21, wherein determining the distributivity of the expression comprises determining the distributivity of each expression defined in the code region.

23. The method of claim 21, wherein each array of a cluster of the one or more clusters is inter-dependent on each other array of the cluster such that a reordering of one array in a particular cluster of the one or more clusters affects each other array of the particular cluster.

24. The method of claim 21, wherein performing the bi-directional data flow analysis comprises:

initializing an input set and an output set of the expression;

preconditioning the input set and the output set of the expression by applying the forward transfer function to a first array to reorder; and applying iteratively the backward transfer function and the forward transfer function until the input set and the output set are unchanged.

* * * * *